Patented Nov. 11, 1930

1,780,981

UNITED STATES PATENT OFFICE

MARY B. PARRISH, OF PHILADELPHIA, PENNSYLVANIA

DYE PREPARATION

No Drawing. Application filed December 19, 1928. Serial No. 327,184.

This invention relates to the preparation of a dye and is more particularly applicable to aniline dyes.

The primary object of the invention is to treat commercial aniline dyes so as to amplify their dyeing capacity.

Another object of the invention is to produce from commercial aniline dye colors, a product which may be universally blended with other colors prepared by this same process without deleterious effect resulting from the crossing of the various colors; and furthermore to produce a dyed fabric which is fast to light, to soap and water.

Further objects of the invention are to provide an amplified dye for the purposes referred to, which is capable of producing a degree of tints or hues of a delicate nature which has heretofore been impracticable; which is suitable for dyeing animal or vegetable fibre; that dispenses with separate mordant and setting solutions; that is stable and efficient in either a hot or cold dyeing bath; that is soluble in boiling water and requires no further operation upon the fabric after removal thereof from the dye bath, except the soaping operation; and that is comparatively simple and inexpensive to prepare and use.

The preparation of the coloring matter in accordance with this invention is an amplification of a commercial aniline dye color. The method of treatment is to mix the aniline dye with an animal digestant in the presence of fermentation producing elements and other ingredients outlined in the following example in Part A. The reaction produced in Part A is a quick fermenation and digestion as compared with the reaction provided in the following Part C.

After performing Part A of the process a setting solution is added in the following Part B together with laundry soap and the mixture is brought to a boiling temperature and cooled to blood heat. The following step outlined under Part C is performed which consists of adding the ingredients of C to the resulting mixture of A and B, which is at blood heat, and stirring the mass while ingredients of C are being added. The resulting product from steps A, B and C is a slightly heavier than water solution which is placed in corked glass containers in a warm room for two weeks to permit a fermentation thereof.

The fermented mixture involving Parts A, B and C treated as outlined above is subjected to step or Part D which consists of mixing the mass with dextrin into a pasty consistency similar to dough and baking it in a moderate oven at a temperature suitable for baking bread, until the paste is crisp but frangible and then it is ground into a powder. The powder resulting from the process is soluble in hot water and may be used in a dye bath hot or cold. When the vegetable or animal fibres are removed from the dye bath no further steps are necessary to further develop the dye in the fabric except a washing in soap suds, because the mordants and setting solution ingredients are inherent in the final product. It has been found and is repeated here by way of example that ¾ drams of the powder resulting from this process dissolved in 2 quarts of water will dye 2 ounces of wool to full intensity.

Part A

The commercial aniline dye is thoroughly mixed in an aluminum vessel with ox gall, sodium chloride and pancreatin in the dry state or powdered form in the following proportions which are given by way of example:—

Aniline dye ½ ounce.
Pancreatin ½ dram.
Ox gall ½ dram.
Sodium chloride 1 dram.

The powder is then mixed with lemon juice or citric acid and then acetic acid is added. The combination of these organic acids appears to give the best results. The following proportions are suitable for the purpose of this invention:

Lemon juice (or citric acid) 2 ounces.
Acetic acid (36%) 5 drams.

When the foregoing elements have been incorporated thoroughly, thereby producing a homogeneous mixture 1 dram of acetone is added.

The pancreatin seems to assimilate and digest the dye in the presence of the ingredients of Part A, thereby increasing its dyeing capacity. The acids and acetone act as mordants and also incorporate fermentation producing elements, while the ox gall adds brilliancy to the color. Sodium chloride tends to hold the dye in suspension which aids in digestion and fermentation. At this point the solution is slightly heavier than water and the coloring matter will not settle out of the solution upon standing. The treatment outlined under Part A produces a quick digestion and fermentation as compared with the Part C and this initial digestion and fermentation imparts to the dyed fabric a fastness to light which is lessened without this premature digestion and fermentation. It is not known whether the increased dyeing capacity or amplification of the commercial aniline dye is the result of an assimilation of the dye by pancreatin in the presence of ferment producing elements, or whether fermentation aids in assimilation or amplification of the dye by the pancreatin.

Part B

This portion of the process adds the combination of vegetable matter which sets the dye in the fabric, and gives a penetration to the dye. The combination will be referred to as a vegetable fixative. The proportion of the ingredients are given by way of example:

Tincture of camomile flowers 1 ounce.
Tincture of hyssop 1 ounce.
Tincture of ground cedar wood 1 ounce.
Tincture of myrrh 1 dram.

The vegetable tinctures are added to Part A together with 1 dram of laundry soap and brought to a boiling temperature. The mixture of Part A and Part B is then cooled to a blood heat and Part C is added and stirred thoroughly.

Part C

Acetic acid (36%) 2 ounces, acetone 1 dram, ox gall U. S. P. 1 dram, are heated to a blood heat, and the following are added: granulated gelatin 3 drams, sodium chloride ¼ dram, pancreatin ¼ dram.

The resulting solution is slightly thicker than water which does not show any physical reaction taking place. The compound is placed in corked containers and stored in a warm room for two weeks. There is an assimilation or digestion that takes place simultaneously with the fermentation during the two weeks storage. After fermentation there is no apparent change in the density of the solution. The slower reaction is necessary to amplify the coloring matter to its fullest dyeing capacity. The gelatine is a bacteria promoting media and also provides a body to the mass which supports the dye particles in suspension while the digestants and ferments are assimilating and amplifying the color.

Part D

After the mass has been treated by A, B and C the resulting product is made into a doughy mass by the addition of dextrin 4 parts to 1 part of the mixture, which adds plasticity and body to the mixture to facilitate the baking. The plastic mixture is then placed in a receptacle and baked in an oven at a moderate temperature the same as bread until it becomes crisp, at which time it is ground to a fine powder of the finished product. The dextrin adds body and plasticity to the mass which reduces the time of baking the mixture and since the dextrin is soluble in water it will not retard the solution of powdered dye. The dextrin also is a thickening agent which gives body to the powdered dye when it is dissolved in water preparatory to dyeing the fabric.

The final resulting powder is the last stage of the process and is ready for dyeing vegetable or animal fiber by merely mixing in water in the approximate proportion of ¾ drams of dye to 2 quarts of water and these proportions have proved by experiment to give the fiber the best and fullest intensity of the color. After the fabric or fibre are submerged in the dye bath for the proper time, they are removed, drained for a while, and submerged in a vat of soap suds.

While the foregoing explanation and examples aid in the understanding of the process of amplifying an aniline dye, it is believed the changes, variations, and modifications may be resorted to without departing from the spirit of the invention as claimed.

What I claim is:

A process of amplifying aniline dye colors comprising predigesting an aniline dye in the presence of pancreatin, ox gall, sodium chloride, citric acid, acetic acid and acetone; thereafter boiling the resulting mass with a mixture of soap and tinctures of vegetable fixatives consisting of camomile flowers, hyssop, ground cedar wood, and myrrh and permitting the mass to cool to blood heat; then redigesting the mass by adding pancreatin, gelatin, acetone, sodium chloride, ox gall and acetic acid at blood heat and permitting the resulting product to ferment in a warm room for approximately two weeks; and thereafter mixing the resulting product with dextrin and baking the mass at bread baking temperature until the product is of a crisp consistency.

In testimony whereof I affix my signature.

MARY B. PARRISH.